July 2, 1940.                L. J. SCHOENBECHLER                2,206,431
                           STEERING WHEEL FOR AUTOMOBILES
                             Filed Aug. 15, 1938          2 Sheets-Sheet 1
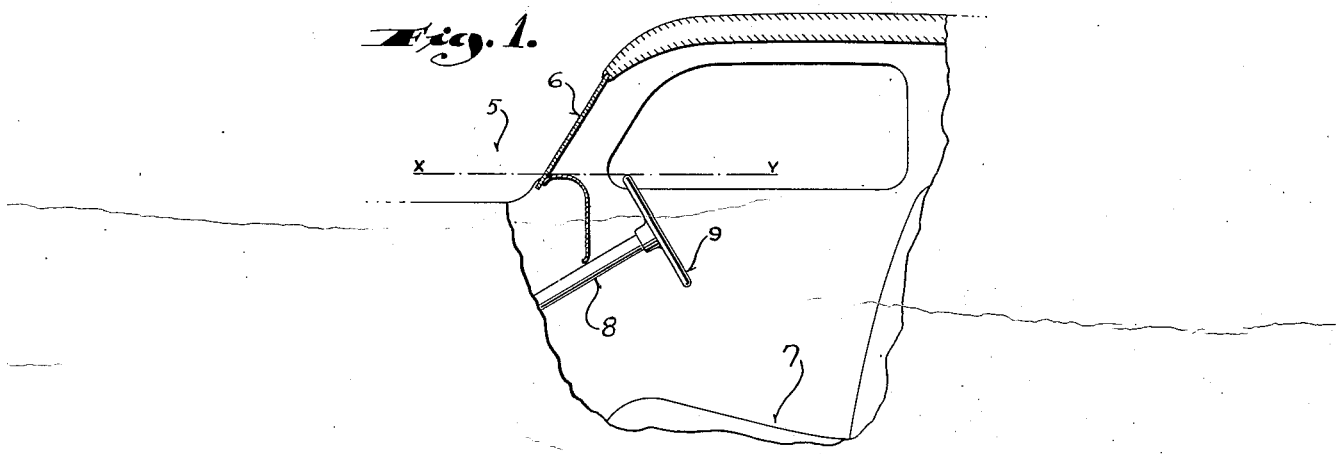
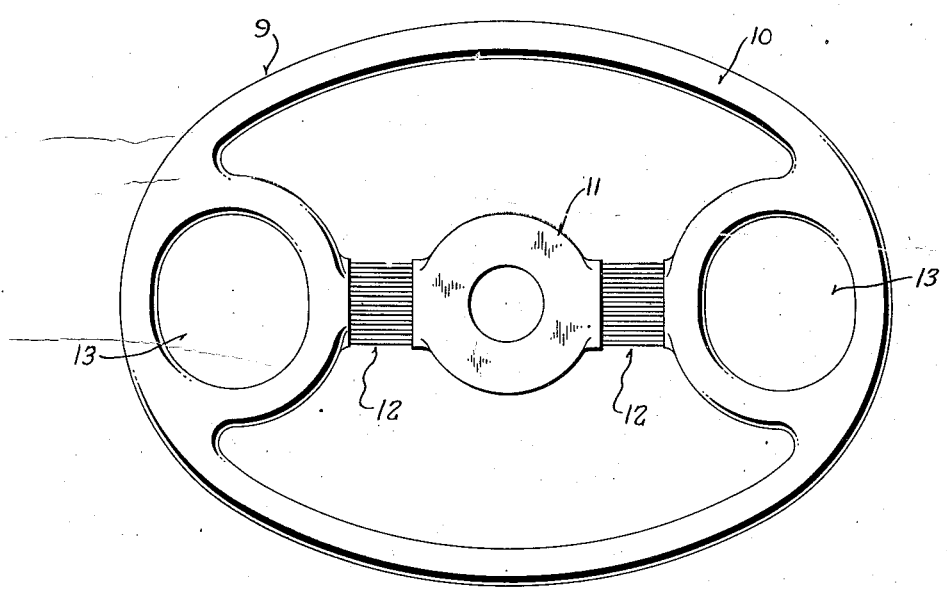
Inventor
Lawrence J. Schoenbechler
By
Attorney July 2, 1940.   L. J. SCHOENBECHLER   2,206,431
STEERING WHEEL FOR AUTOMOBILES
Filed Aug. 15, 1938   2 Sheets-Sheet 2
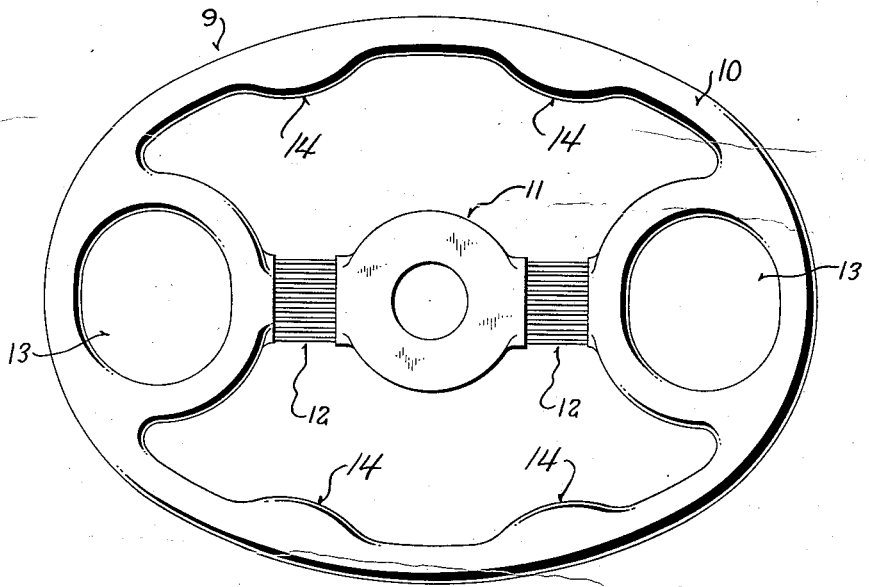
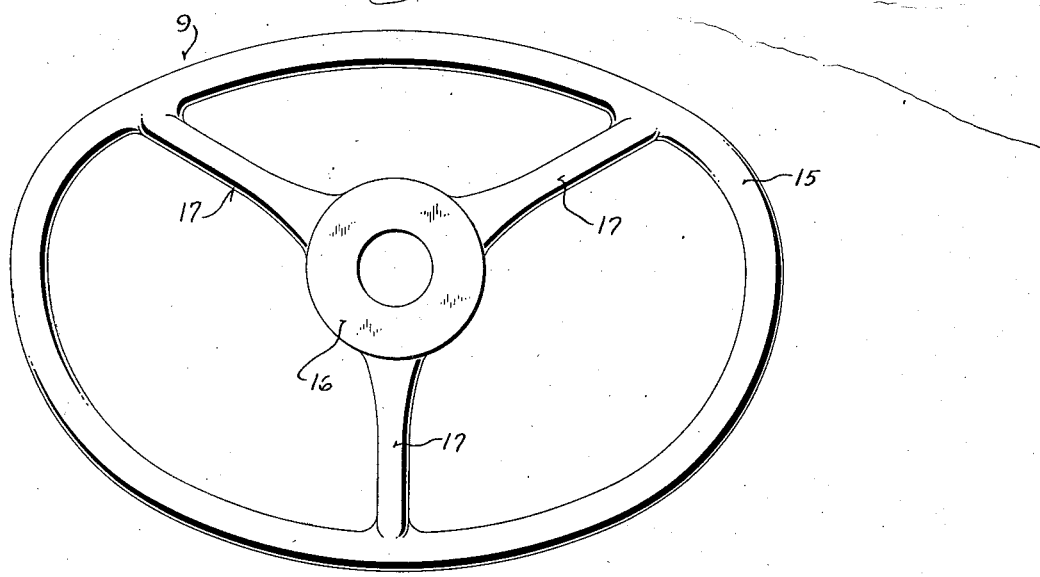
Inventor
Lawrence J. Schoenbechler
By Milton Jones
Attorney Patented July 2, 1940

2,206,431

UNITED STATES PATENT OFFICE 2,206,431

STEERING WHEEL FOR AUTOMOBILES

Lawrence J. Schoenbechler, Omro, Wis.

Application August 15, 1938, Serial No. 224,992

3 Claims. (Cl. 74—552)

This invention relates to steering wheels and is especially useful for vehicles such as automobiles or the like.

In the conventional automobile of the present day, the steering wheel is so positioned and of such size and shape that the upper part of the rim invariably constitutes a distraction within the normal field of the driver's vision. Unless the driver is exceptionally tall or extremely short, he is confronted with the necessity of craning his neck to see over the top of the steering wheel, or of "hunching down" to look through the wheel. This, needless to say, is a source of considerable discomfort.

It is therefore an object of this invention to provide a steering wheel of improved construction whereby without change in the position of the steering column, the possibility of having the top of the wheel extend objectionably into the field of vision of any user is entirely removed.

Another object of this invention is to provide a steering wheel which not only assures greater comfort to the operator by lying wholly beneath the field of vision, but also affords greater space between the lower edge of the rim and the operator's seat.

Another object of this invention is to provide a steering wheel having an improved construction which facilitates rapid turning of the wheel as is necessary in turning sharp corners or in parking.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiment of the invention constructed in accordance with the best modes so far devised for the practical application of the principles thereof, and in which:

Figure 1 is a view partly in side elevation and partly in section through an automobile illustrating the application of this invention thereto;

Figure 2 is a plan view showing one form of this invention; and

Figures 3 and 4 are plan views similar to Figure 2, illustrating slightly modified embodiments thereof.

Referring now particularly to the accompanying drawings in which like numerals indicate like parts, the numeral 5 designates a conventional automobile having a windshield 6 and a driver's seat 7 with a steering column 8 rising up into the space between the lower edge of the windshield and the forward edge of the seat. Mounted on the upper end of the column 8 in the usual manner is the steering wheel 9 of this invention.

As noted hereinbefore, one of the purposes of this invention is to provide a steering wheel, so part of which rises up into the field of vision of the driver when the wheel is in its normal or customary position, that is, when the front wheels are parallel to the longitudinal axis of the vehicle. Hence, no part of the wheel 9 extends above a horizontal plane passing through the lower edge of the windshield 6, as defined by the line X—Y in Figure 1.

The wheel comprises a continuous rim 10 of substantially oval shape, a hub 11, and spokes 12 connecting the hub with the rim. Being oval-shaped or elliptical, as shown, the top of the rim can lie wholly below the horizontal plane passing through the lower edge of the windshield, and the lower portion of the rim can be spaced a distance greater than usual from the driver's seat without in anywise affecting the functioning of the wheel, it being understood that the wheel is so positioned that its major axis is horizontal in the customary position of the wheel.

This lowering of the upper portion of the wheel rim obviously eliminates obstruction to the driver's vision during normal driving, and the raising of the lower rim portion not only provides greater clearance between the driver and the steering wheel, but also provides a greater gap between the wheel and the seat for permitting the driver to freely enter and leave the seat, especially from the right-hand side.

While it is true that with the steering gear ratios now generally in use on automobiles, more than a quarter turn of the steering wheel is necessary in turning a ninety degree corner, by far the greatest portion of the driving is done with the front wheels directly forward or very nearly so. Hence, the advantages of this construction are in nowise minimized by the requirement for rotation of the steering wheel an excess of ninety degrees.

Quick rotation of the wheel is facilitated by the provision of rings 13 located at substantially diametrically opposed portions of the wheel, preferably in the ends of the oval. These rings, as shown in Figure 2, are formed as an integral part of the rim, and preferably the spokes 12 extend from the hub to the rings so that when the wheel is in its normal position, an unobstructed view of the instruments on the instrument board panel is afforded through the wheel.

To facilitate gripping the wheel when the use of the rings 13 is unnecessary, bulges 14 may be provided along the sides of the oval wheel, as shown in Figure 3.

It is also possible to embody the concept of this invention in a construction such as illustrated in Figure 4 wherein the oval-shaped rim 15 is located eccentrically with respect to the hub 16, being connected thereto by spokes 17. With this construction, the upper edge of the rim can be brought quite close to the hub without in anywise disturbing the relative position of the lower part of the rim with respect to the driver's seat, which in some instances should remain to insure a comfortable driving posture.

From the foregoing description taken in connection with the accompanying drawings, it will be readily apparent to those skilled in the art that this invention provides a steering wheel for automobiles and the like which adds to the comfort of driving and eliminates the distraction of having some part of the wheel protrude into the field of the driver's vision.

What I claim as my invention is:

1. A steering wheel for automobiles and the like comprising: a continuous rim; a hub inside the rim; and spokes connecting the hub with the rim, said rim having substantially diametrically opposed substantially round openings therein at its points of connection with the spokes, said openings being of a size to permit the insertion of the hand for engagement with the edges of the openings so as to facilitate spinning the wheel.

2. A steering wheel for automobiles and the like comprising: a substantially oval-shaped rim; a substantially round ring at each end of the oval inside and integral with the rim; a hub; and spokes connecting the hub with said rings.

3. A steering wheel for automobiles and the like comprising: a substantially oval-shaped rim; a ring at each end of the oval inside the rim formed integrally with the rim; bulges on each side of the oval inside the rim; a hub; and spokes connecting the hub with said rings.

LAWRENCE J. SCHOENBECHLER.